United States Patent [19]
Newton

[11] Patent Number: 5,420,903
[45] Date of Patent: May 30, 1995

[54] MICROWAVE OBJECT COUNTER AND METHOD

[75] Inventor: Donald M. Newton, Wilmington, N.C.

[73] Assignee: Cybortech, Inc., Eden, N.C.

[21] Appl. No.: 79,373

[22] Filed: Jun. 21, 1993

[51] Int. Cl.⁶ .............................. A63B 71/06
[52] U.S. Cl. ............................ 377/5; 377/6; 377/9
[58] Field of Search ....................... 377/5, 6, 9

[56] References Cited

U.S. PATENT DOCUMENTS 5,136,621 8/1992 Mitchell et al. ................ 377/5

Primary Examiner—Margaret Rose Wambach

[57] ABSTRACT

A microwave signal is generated from a fixed source across a fixed path to trigger individual FM transmitters in passing objects such as race vehicles. A vehicle transceiver then sends an omnidirectional specific frequency FM radio carrier signal with a tone imposed to a console and a portable remote receiver. As the FM signal and tone are detected and decoded by the console receiver, data word is sent to a scoring computer which displays the lap of that particular vehicle and the current order of all vehicles.

24 Claims, 4 Drawing Sheets

MICROWAVE OBJECT COUNTER AND METHOD

BACKGROUND OF THE INVENTION

1. Field Of The Invention

The invention herein pertains to an object identification and counter and particularly to a vehicle counter which can be used at a racetrack or other location for counting laps as the vehicles reach a particular position on the track.

2. Description Of The Prior Art And Objectives Of The Invention

Various forms of mechanical, electrical, electromechanical and electronic object counters such as lap counters have been devised in the past for toy and full size vehicle racers. For example, U.S. Pat. No. 3,588,869 demonstrates and electronic scoring system for vehicles in a plural lap race including a telemetry transmitter on each vehicle which generates distinctive signals to identify a particular vehicle and the lap completed. U.S. Pat. No. 3,572,711 demonstrates a timer and lap counter which includes a switch which produces electrical impulse upon passage of the racer. The electrical impulses operate a timer and a visual display demonstrates the number of laps traveled by the particular vehicle.

The prior art devices which have been used are inaccurate in that the counters may be advanced through erroneous signals which are inadvertently transmitted or such signals may be credited to the wrong vehicle. Also, the frequencies transmitted by the individual cars may not be distinct enough for the receiver to differentiate and thus produce an erroneous count.

Thus, with the problems and disadvantages associated with prior art counters, the present invention was conceived and one of its objectives is to provide a combination object counter which provides a microwave generator which is adjusted to a narrow beam width for activating each transceiver as it reaches the beam position across a fixed location.

It is another objective of the present invention to provide a transceiver which includes an FM transmitter which is activated by the microwave beam and which in turn will generate an omnidirectional FM radio signal which has been superimposed with a specific audio tone.

It is still another objective of the present invention to provide a combination object counter which includes a remote FM signal and tone receiver having a plurality of receiving circuits which accurately distinguish the FM frequencies received and which includes a computer activated by the FM frequency received.

It is another objective of the present invention to provide a secondary portable FM signal receiver and counter which is specific to the particular object.

It is still another objective of the present invention to provide an object counter such as a vehicle lap counter which includes a "one-shot" or holding circuitry in the transceiver and in the receiver which improves the accuracy of the count and which will prevent reflected signals or the like from causing a multiple count from the same signal.

SUMMARY OF THE INVENTION

The invention presented herein pertains to an object counter and particularly a lap counter for automobiles. A microwave signal is generated from a fixed point inside the racetrack, across the start/finish line. During racing, vehicles which cross the line receive the narrow microwave beam generated through a transceiver on the vehicle which causes a specific wavelength FM signal in turn to be sent to a console type receiver. The specific omnidirectional FM signal is transmitted to a fixed console which distinguishes the FM signals from the various vehicles and activates a scoring computer. A tone is also imposed on the carrier signal from the vehicle and as the tone and FM carrier are received by the console, the scoring computer increments and displays the lap number of the particular vehicle. Holding circuitry is incorporated into the transceiver and into the console receiver to prevent signal break-up from inadvertently increasing the count made by the console in the event two (2) or more signals are received per lap. A portable or hand held FM signal receiver having single FM frequency receiving capability is also useful in combination with the console for pit crews or the like for viewing the lap number of their particular vehicle.

DESCRIPTION OF THE PREFERRED EMBODIMENT

Figure 1:
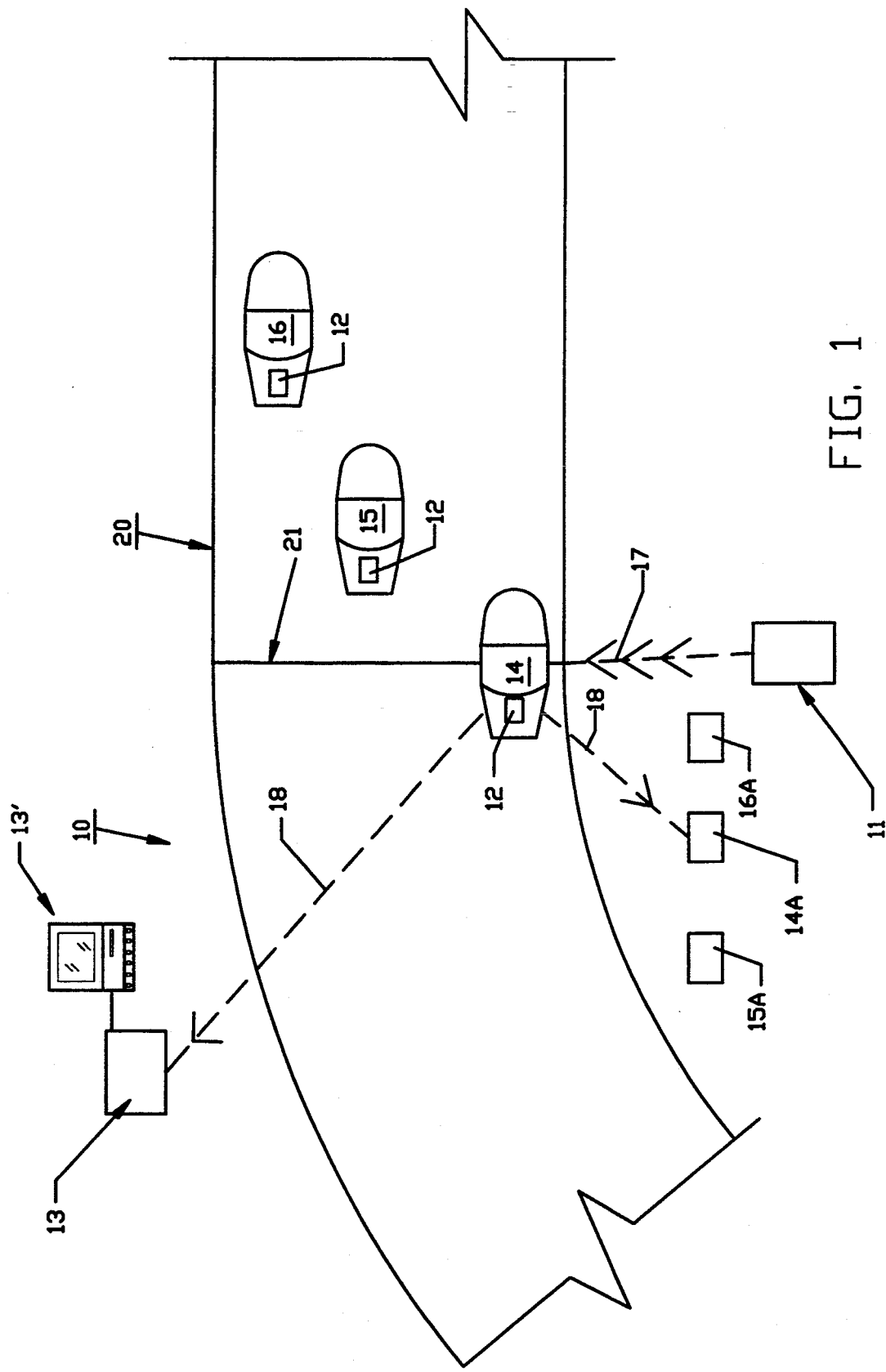
FIG. 1 illustrates in block form the combination invention as used on an automobile racetrack having a microwave generator, a vehicle transceiver, console, computer and portable FM signal receivers.
Figure 2:
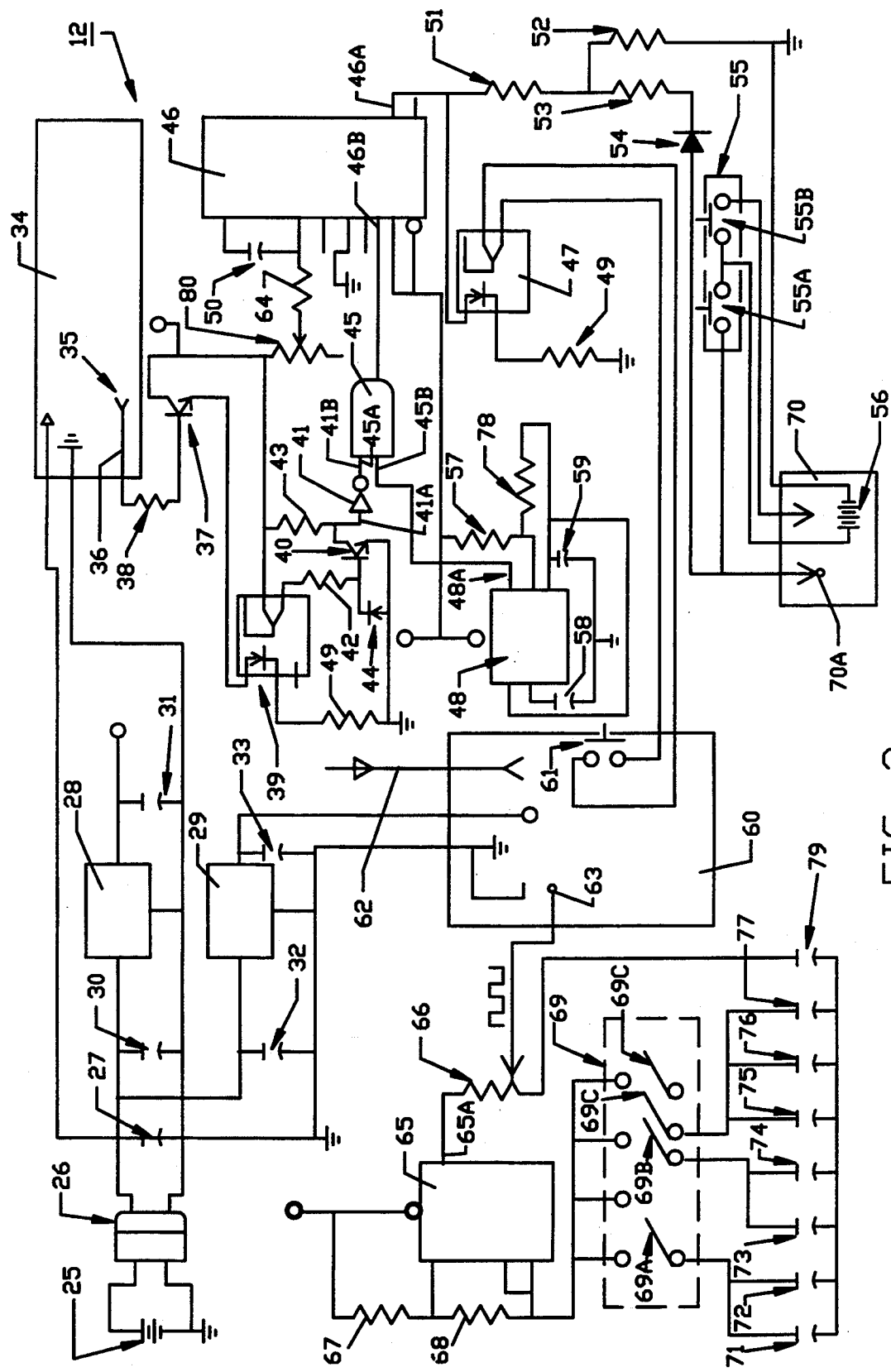
FIG. 2 demonstrates in schematic fashion the electrical circuitry of a vehicle transceiver.
Figure 3:
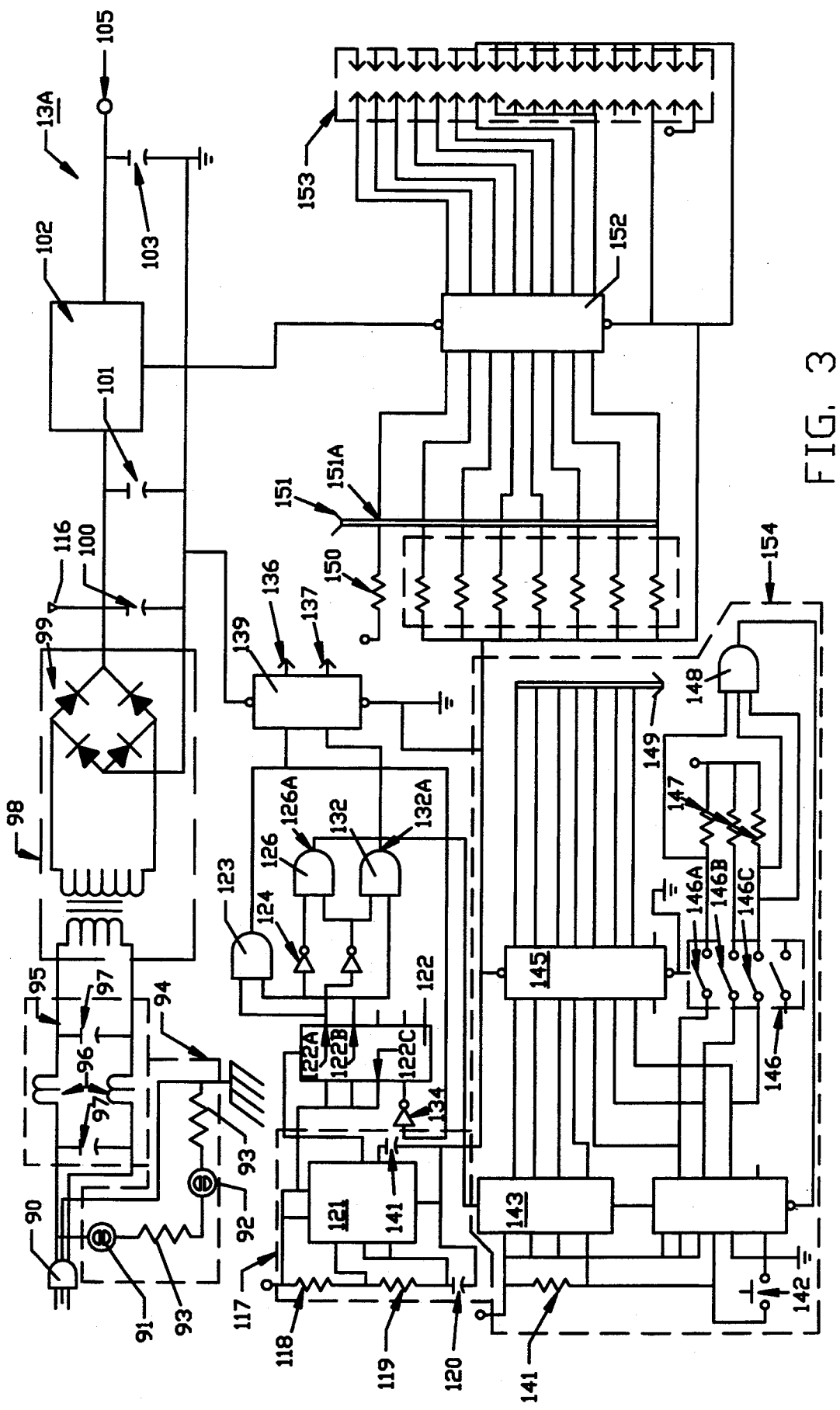
FIG. 3 shows the receiver console circuitry which provides power, control logic and communications to the scoring computer.

The preferred form of the apparatus of the invention is illustrated schematically in FIGS. 1, 2 and 3 in which a microwave generator, transceiver and receiver are used in combination to count, identify and visually display the laps completed of a particular race vehicle. A transceiver mounted in the vehicle is triggered by a fixed microwave generator which directs a beam transversely across the track at a particular point. When activated the transceiver sends a specific frequency FM signal which may be one of forty or more frequencies assigned for use by the Federal Communication Commission. Each vehicle has its own specific FM carrier signal and in addition a tone is superimposed on the carrier signal which can be decoded by a remote console positioned some distance from the track. Holding circuitry within the transceiver and the console prevents inaccurate counting as may occur if the FM signal is momentarily interrupted by another vehicle or by other obstacles or conditions. As the console detects a particular signal it will index a scoring computer and visually display the vehicle number and its lap count. The console as would be understood, includes a number of receiver circuits for a plurality of vehicles. A secondary portable receiver having only one receiver circuit can be used by the vehicle owner or pit crew which will only display the lap of the one particular vehicle.

DETAILED DESCRIPTION OF THE DRAWINGS AND OPERATION OF THE INVENTION

For a better understanding of the invention and its operation, turning now to the drawings, FIG. 1 illustrates in schematic fashion a top view of racetrack 20 with vehicles 14, 15 and 16 thereon. Vehicle 14 is crossing start/finish line 21 and transceiver 12 therein has been triggered by microwave generator 11 of lap counter 10 which directs a narrow microwave beam 17 across track 20. Combination lap counter 10 includes microwave generator 11, vehicle transceiver 12, remote receiver console 13 attached to scoring computer 13' and remote portable receiver 14A. As would be understood from FIG. 1, portable receivers 14A, 15A and 16A receive FM carrier signals respectively only from vehicles 14, 15 and 16. Console receiver 13 comprises circuitry whereby FM transmissions from vehicles 14, 15 and 16 are all received and displayed whereas portable receivers 14A, 15A and 16A can only record laps from one vehicle, their particular corresponding vehicle number.

In a typical multi-lap race, as vehicle 14 reaches start/finish line 21 during each lap, transceiver 12 within vehicle 14 is triggered by microwave beach 17. Transceiver 12 then generates an omnidirectional carrier FM radio signal as shown in FIG. 1 by broken line arrows 18. FM carrier signal 18 is received by both console receiver 13 and portable receiver 14A (as seen in FIG. 1). Console receiver 13 may be for example, under the supervision and control of race officials whereby the particular lap of race car 14 is counted and visually shown on console 13 having a CRT display. Thus, with each succeeding lap, vehicle 14 would increment counter circuitry within console 13 and the display would demonstrate the laps completed of that particular vehicle. Similarly, portable receiver 14A would likewise be similarly useful for pit crews and the like but would be specific to the FM carrier signal generated only by vehicle 14.

In addition to the FM carrier signal transmitted, a tone is imposed on the carrier signal by transceiver 12 as a safety and accuracy measure whereby receiver console 13, to record a count, the correct carrier and tone frequencies must arrive simultaneously and this eliminates reflected FM signals or the like from duplicating the lap count and insures that the correct vehicle is counted.

Although lap counter combination 10 is shown herein for racing vehicles such as automobiles, it could likewise be used for boat racing, motorcycle racing or other types of racing or vehicle or other article identification. Additionally, the device could be used for counting aircraft or for identification of vehicle fleets as used in industry or the military. By making certain modifications to the system allied forces could be more precisely identified and thus would help eliminate the possibility of friendly fire damaging allied vehicles.

Microwave generator 11 as shown in FIG. 1 may be for example model NJR 4104 as made by the Japan Radio Company, Ltd. of Tokyo, Japan. Generator 11 operates at a frequency of 10.525 GHz and is set to a narrow beam width. Transceiver 12 as shown schematically in Fig. 2 is powered by 12 volt DC battery 25 of the vehicle or an independent 12 volt battery. Battery 25 as seen is attached to connector 26. The power circuit for transceiver 12 includes 2200 microfarad capacitor 27 and voltage regulators 28 and 29. Voltage regulator 28 provides regulated plus 5 volts DC with tantalium filter 6.8 microfarad (mf) capacitor 30 (input) and 6.8 mf capacitor 31 (output). Voltage regulator 29 provides regulated plus 8 volts DC with tantalium 6.8 mf tantalium capacitor 32 (input) and 6.8 mf filter capacitor 33 (output). Microwave detector 34 comprises a model USRS01018ZB radar detector as manufactured by Tandy Corporation of Dallas, Tex. A small light 35 is illuminated when a microwave beam is detected and conductor 36 is joined to light 35 and transistor 37 through biasing resistor 38. Resistor 38 comprises a 750 ohm resistor of conventional type. When light 35 is illuminated, opticoupler 39 is activated. Thus, transistor 40, not-gate 41, 10 k resistor 42, 10 k resistor 43 and diode 44 provide an analog to TTL interface. When opticoupler 39 is turned on a logic high of 1 occurs at pin 45A of and-gate 45. Pin 45B is connected to an oscillator circuit formed from 555 timing chip 48, 0.01 mf capacitor 58, 1 mf capacitor 59, 15 k resistor 57, and 4.7 k resistor 78. Capacitor 59 determines the frequency of the square wave output on pin 48A of 48 as the frequency must be greater than or equal to 20 Hz. Multivibrator 46 (one-shot), capacitor 50, potentiometer 80 and resistor 64 make up a "one shot" circuit. Once multivibrator 46 is triggered, it does not reset until a time determined by resistor 64, potentiometer 80 and capacitor 50 expires. The length of this delay can be adjusted with potentiometer 80. A rising edge input at multivibrator, pin 46B (input) before the delay expires will reset the timer. 10 k resistor 49 provides opticoupler 39 input biasing.

When and-gate pin 45A goes high, the output of 555 timing chip 48 is presented at the input of multivibrator 46 causing multivibrator 46 to be continually retriggered as long as this condition holds. Consequently, multivibrator pin 46A goes high when not-gate pin 41B goes high and remains so until and-gate pin 45A goes low long enough for the delay of multivibrator 46 to expire. Multivibrator pin 46A serves two purposes, to increment counter display 70 and to turn opticoupler 47 on.

Display 70 is a five digit LCD display with an on board counter circuit 70A. Counter circuit 70A operates from "AA" 1.5 volt DC battery 56. 15 k ohm resistor 51 and 10 k ohm resistor 52 are a voltage divider providing 1.5 VDC through 1 k ohm resistor 53 when multivibrator pin 46A is high. Resistor 53 and diode 54 are for current limiting and protection. Switch 55B resets display 70 to all zero's (0's) when depressed. Switch 55A provides a count test for the display when depressed to count.

Timing chip 65, 1 k resistor 67, 10 k resistor 68, 10 k pot 66, switch 69 and 0.047 mf capacitor 71, 72, 73, 0.01 mf capacitor 74, 76 0.022 mf capacitor 75 and 0.0047 mf capacitor 77 make up an oscillator circuit for the security tone transmitted. 4.7 mf capacitor 79 provides for chip pin 65A output filtering. Resistors 67 and 68 were chosen to provide a symetrical square wave output on timing chip pin 65A within the 300 Hz to 10 KHZ range. Switch 69 allows selection of different capacitor combinations. 69A=capacitor 71 and 72; 69B=capacitor 73, 74; and 69C=capacitor 75, 76, and 77. The amount of capacitance between timing chip pin 65B and ground determines the frequency of the oscillation. The values provided on the following frequencies are determined: Capacitors 71-77 outputed at pin 65A; switch 69A=723 HZ, switch 69B=1195 HZ, switch 69C=1697 HZ. Pot 66 is adjusted to provide a 400 MV P-P square wave as an input to the microphone connection 63 of FM transmitter 60.

Transmitter 60 is a Realistic (Radio Shack, Inc.) CAT No. 21-401 FM transceiver operating at 49.830 MHZ. The output of opticoupler 47 is connected to the transmit switch 61 of FM transmitter 60. When microwave detector 34 detects the trigger beam, multivibrator 46 is triggered turning on opticoupler 47 which keys transmitter 60, sending timing chip 65 oscillator frequency via antenna 62 until detector 34 clears the microwave beam for the delay period of multivibrator 46.

Microwave trigger beam 17 could be secured by changing radar detector 34 to a microwave receiver matched to trigger beam 17 frequency. Further trigger beam security can be achieved by encoding trigger beam 17 or by using multiple trigger beams at different frequencies.

Figure 4:
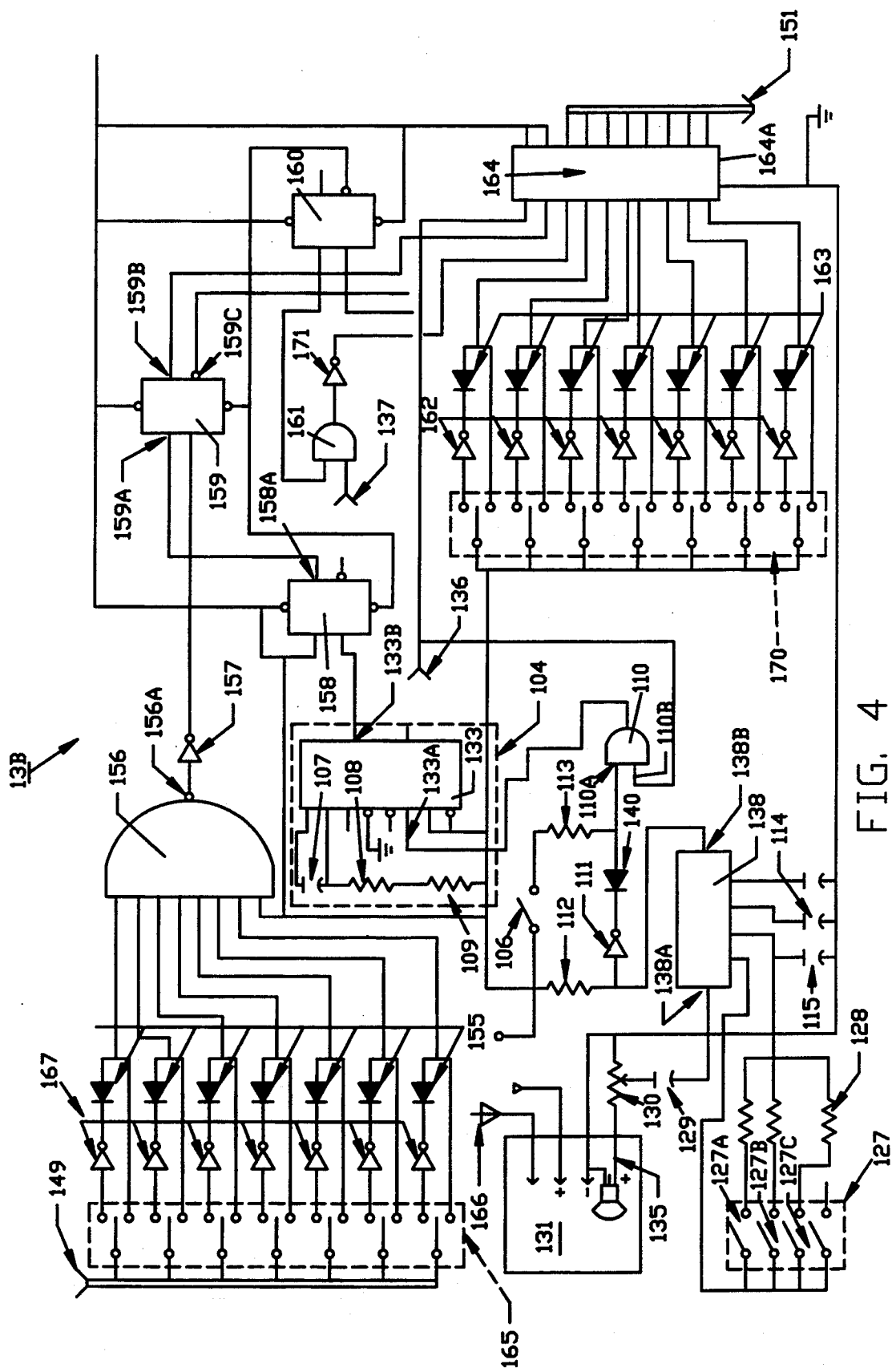
FIG. 4 shows the circuitry of the FM receiver in the console for a single FM frequency.

Receiver console 13 consist of circuitry 13A as shown in FIG. 3 and single frequency FM receiver circuitry 13B as seen in FIG. 4 (for up to 128 different vehicles and scoring computer 13') to receive and process output data for all vehicles. Console circuitry 13A as seen in FIG. 3 provides power, clocking, address scanning and output communications for all vehicle receiver circuits 13B. Each vehicle receiver circuitry 13B provides FM tone reception, address decoding, trigger hold and output data word generation for each vehicle. The data generated by receiver console 13 may be instead generated by transceiver 12 replacing the superimposed FM tone and providing both vehicle identification and other information. Output data is received and processed by scoring computer 13' which provides vehicle order, lap number and average lap time. Other features are provided to add or subtract vehicles for the race as well as alarm on anomalous conditions such as vehicle absence. Scoring computer 13' may consist of a conventional 286 SX or greater personal computer which can be independent as seen in FIG. 1 or incorporated into console receiver 13.

Console receiver circuitry 13A as seen in FIG. 3 can receive DC power, however AC power is shown as plug 90 is a standard 120 V AC with ground. Bulbs 91, 92 and 1 m resistors 93 compose a transient surge suppression circuit 94 for input power and coils 96 and 1500 mf capacitors 97 compose a low frequency electro-magnetic interference suppression circuit 95 for the input power. 120 V AC input power is converted into +9 V DC by conventional power supply 98 and external filter (5000 mf) capacitor 100. +9 V DC power is supplied to the console receiver at connection 116. Voltage regulator 102 provides regulated +5 V DC with 10 mf tantalium filter capacitors 101 (input) and 103 (output) at connection 105.

Oscillator circuit 117 made up of timing chip 121, 0.01 mf capacitor 141, 0.01 mf capacitor 120, 10K ohm resistor 118 and 15K ohm resistor 119 comprises the master clock having a frequency of 38.4K Hz. Circuit 117 output is connected to the count input of binary counter 122. Binary counter 122 output 122A is the least significant bit. Counter 122 output 122 A & B connect to and-gate 123. When 122 A & B are both logic 1, a logic 1 is present at the input to not-gate 134. The output of not-gate 134 is then logic 0 which activates binary counter reset input 122C. Under these conditions, binary counter 122 outputs 122 A & B will reset to logic 0 on the next clock pulse from oscillator circuit 117. Binary counter outputs 122A and 122B therefore count a repeating sequence from binary 00 to binary 11. The output from and-gate 123 is boosted through line driver 139 which provides the reset clock pulse at connection 136 to vehicle receiver circuits 13B. Not-gate 125 and and-gate 132 provide a logic 1 pulse whenever counter 122's outputs 122 A & B are binary 01. This pulse is boosted through line driver 139 and becomes the data strobe connection 137 to vehicle receiver circuits 13B. Not-gate 124, not-gate 125 and and-gate 126 provide a logic 1 pulse at 126A whenever counter 122 outputs 122 A & B are binary 00. The pulse from 126A is the count pulse for address scanner 154.

Address scanner 154 is made up of binary counters 143 and 144, line driver 145, 4 position DIP switch 146, nand gate 148, 1 k ohm resistors 141 and 147 and normal open momentary switch 142 with an output on address scanner bus 149. Pull-up resistor 141 and switch 142 reset counter 143 and 144 to an output of all 0's when activated. Binary counter 143 and 144 are cascaded to form a 7 bit binary counter. Switch 146, pull-up resistors 147 and nand gate 148 allow the maximum scanned address to be selectable when 146 A, B and C are all closed the scanner counts from 0 to 127 (7 F HEX), 146 A and B closed from 0 to 63 (4 F HEX), 146A closed from 0 to 31 (1 F HEX), all switches open from 0 to 15 (0 F HEX). The counter output is boosted by line driver 145 and connected to the address scanner bus 149. Address scanner bus 149 is connected to all system vehicle receiver circuits 13B.

Data communications to the scoring computer 13 is achieved with an output data bus 151, 2.7 k ohm resistor 150, 2.7 k ohm resistor network 149 line driver 152 and a standard 36 pin female centronix connector 153. All vehicle receiver circuits 13B are connected to console circuitry 13A (FIG. 3) via 8 bit output data bus 151. Bus output 151 A is the output data strobe lead and is held high by resistor 15 when not latched. The remaining 7 output data leads on bus 151 are held low by resistor network 149 tied to ground. The strobe and output data word are boosted with line driver 152 and sent to the scoring computer via connector 153.

As earlier explained, an FM tone from vehicle 14 is received by transceiver 12 via antenna 166. Positive speaker lead 135 of receiver 131 is connected to tone decoder chip 138 pin 138A via resistor 130 and capacitor 129. Resistor 130 is adjusted to provide a 500 mV AC signal when receiving tone at decoder chip pin 138A. Tone decoder chip 138, capacitors 129, 115, 114, resistors 20K (pot 128), switch 127 and pull-up 1 k ohm resistor 112 make up a tone decoder circuit. 0.1 mf capacitor 115 along with the potentiometer selected by switch 127 determine the trigger frequency of tone decoder chip 138. Resistors 128 are tuned to match the transmit tones of transceiver 12 with switch 127A=723 Hz, switch 127B=1195 Hz, and switch 127C=1697 Hz. When tone decoder chip 138 detects the proper tone at pin 138A, it provides a ground at pin 138B. Not-gate 111 is joined between decoder chip 138 and, and-gate 110. The ground at pin 138B provides a logic 1 at pin 110A of and-gate 110. Switch 106, diode 140 and 1 k ohm resistor 113 provide a test trigger switch for trouble shooting also applies a logic 1 at and-gate 110A. Diode 140 prevents reverse biasing of not-gate 111 when switch 106 is closed. Pin 110B of and-gate 110 is connected to the reset clock pulse lead 136. Multivibrator 133, 220 mf capacitor 107, resistor 109 and resistor 108 make up a "one shot" circuit 104 with an input on multivibrator pin 133A and an output on pin 133B. Once multivibrator 133 is triggered, circuit 104 does not reset until a time determined by resistors 109, 108 and capacitor 107 expires. The length of the delay can be adjusted with potentiometer 109 consisting of a 20 k ohm adjustable resistor. A rising edge input at pin 133A before the delay expires will reset the timer.

When pin 110A goes high, the reset clock signal 136 from the mother board is presented at the input multivibrator 133 causing multivibrator 133 to be constantly retriggered as long as this condition holds. Consequently, pin 133B goes high when pin 110A goes high and remains so until pin 110A goes low long enough for multivibrator 133 delay timer (not shown) to expire.

Each vehicle receiver circuit 13B is assigned a unique address between 0 and 127 using 8 position (1 position not shown) single pole double throw DIP switch 165, not-gates 167, diodes 155 and 8 input nand gate 156. Addresses should be in ascending order starting at 1. The address is then converted from decimal to binary for address switch 165 settings. Each lead off of the address scanner bus 149 can be switched to either be connected directly to nand gate 156 or to be connected to not-gates 167. An address bit of 1 is direct connected to nand gate 156. An address bit of 0 is connected to not-gate 167. Diodes 155 prevent reverse biasing of not-gates 167. When the correct address occurs on address scanner bus 149, nand gate output 156A goes low. This low is changed to a high by not-gate 157.

D-type positive edge triggered flip-flops 158, 159 and 160 sequence the trigger sources and insure that data is output only once for each trigger event. When multivibrator 133 is triggered the low to high transition from output 133B triggers flip-flop 158. Flip-flop output 158A which is connected to the data input 159A of flip-flop 159 goes high. When the selected address off the vehicle receiver circuit 13B occurs on the address scanner bus 149 the output of not-gate 157 goes high. This transition triggers flip-flop 159. If flip-flop 158 has also been triggered output 159B goes high and output 159C goes low. If flip-flop output 159B is high, flip-flop 160 resets both flip-flop 158 and 159 with the next reset clock pulse 136. After this occurs the vehicle receiver circuit 13B cannot be triggered again until multivibrator 133 delay timer expires as described previously.

8 position (1 position not shown) single pole double throw DIP switch 170, not-gates 162 and diodes 163 are used to select the data word output on the output data bus 151 when flip-flop output 159B goes high. 8 bit data latch 164 provides the interface between the vehicle receiver circuit 13B and the output data bus 151. The output data word is selectable between HEX 00 and 7F (0–127 decimal). The desired data word is converted to binary. If a bit is 1 the switch is set to the direct connection to latch 164. If a bit is 0 the switch is set to the not-gate 162. Diodes 163 are to prevent reverse biasing on not-gates 162. The output data word is totally independent of the board address described earlier. Latch outputs 164A are tri-stated (high impendence) when it is not enabled. This allows multiple latches to be connected to bus 151. When flip-flop output 159B goes high and output 159C goes low, this enables latch 164 passing the selected output data word to the output data bus 151. After flip-flop 159 has been triggered and before flip-flop 160 resets the circuit, the data strobe pulse from 137 is passed through and-gate 161, inverted by not-gate 171 and put on the data bus 151 to be communicated to the scoring computer 13. Address scanner 154 insures only one vehicle receiver circuit latch 164 is enabled at a time.

Transceiver 12 transmits the FM carrier wave with the selected tone when triggered as earlier explained. Receiver console 13 accepts the transmission and demodulates the tone. When the tone decoder 138 detects the proper tone, multivibrator 133 is triggered. When address scanner 154 reaches the appropriate address, latch 164 is enabled. This sends the corresponding data word to the scoring computer indicating that car has passed through microwave beam 17.

The illustrations and examples provided herein are for explanatory purposes and are not intended to limit the scope of the appended claims. While the examples herein generally show the device and method as used for race cars, other objects other than race cars can be counted and identified by the invention.

I claim:

1. An object counter comprising in combination: means to generate a narrow beam microwave signal, a transceiver, said transceiver in communication with said microwave generating means, said transceiver for receiving microwave signals and for generating an omnidirectional encoded radio wave, radio wave receiving means, said receiving means communication with said transceiver for receiving signals from said transceiver, said receiving means comprising a computer.

2. An object counter as claimed in claim 1 wherein said narrow beam microwave generating means is positioned at a fixed location.

3. An object counter as claimed claim 1 wherein said transceiver is mounted within the object.

4. An object counter as claimed in claim 1 wherein said transceiver comprises an FM radio signal transmitter, said signal transmitter being inactive until said transceiver is activated by said narrow beam microwave generating means.

5. An object counter as claimed in claim 1 wherein said transceiver comprises a microwave receiver.

6. An object counter as claimed in claim 1 wherein said receiving means comprises an FM signal receiving means.

7. An object counter as claimed in claim 1 wherein said receiving means is positioned at a fixed location relative to said transceiver.

8. An object counter as claimed in claim 1 wherein said transceiver includes signal holding circuitry.

9. An object counter as claimed in claim 1 wherein said receiving means includes signal holding circuitry.

10. An object counter as claimed in claim 1 wherein said receiving means comprises multiple signal receiving circuits.

11. An object counter as claimed in claim 1 and including second signal receiving means.

12. An object counter as claimed in claim 11 wherein said receiver signal receiving means includes a holding circuit.

13. An object counter as claimed in claim 11 wherein said signal receiving means includes a counter and a display.

14. An object counter as claimed in claim 1 wherein said transceiver comprises tone generating circuitry.

15. An object counter as claimed in claim 1 wherein said receiving means comprises tone decoding circuitry.

16. An object counter as claimed in claim 1 wherein said receiving means comprises an address scanner.

17. An object counter as claimed in claim 1 wherein receiving means generates data.

18. An object counter as claimed in claim 1 wherein receiving means communicates with said computer.

19. A method of identifying objects passing a fixed location comprising the steps of:
   (a) generating a narrow beam microwave signal across the path of a plurality of objects;
   (b) receiving the microwave signal by said objects;

(c) transmitting an encoded radio signal from each of said objects upon reception of the narrow beam microwave signal;

(d) receiving said encoded radio signals by a receiver remote of said objects; and (e) counting and displaying the passage of said objects by a remote receiver computer.

20. The method as claimed in claim 19 wherein the step of receiving said encoded radio signals comprise the step of decoding the signals.

21. The method of claim 19 and including the step of scanning for reception of said encoded radio signals.

22. The method of claim 19 and including the step of generating data for reception by said scoring computer.

23. The method of claim 19 wherein the step of receiving the narrow beam microwave signal by said objects comprises holding the radio signal on for a time period after the microwave beam clears.

24. The method of claim 19 and including simultaneously receiving said encoded radio signals by a plurality of remote receivers.

* * * * *